United States Patent
Correia et al.

(10) Patent No.: US 11,035,590 B2
(45) Date of Patent: Jun. 15, 2021

(54) SOLAR PANEL TRACKING SYSTEM

(71) Applicant: SOLARISFLOAT, LDA, Matosinhos (PT)

(72) Inventors: Nuno Correia, Oporto (PT); Carla Gomes, Oporto (PT); Ricardo Pinto, Oporto (PT); Luis Pina, Oporto (PT); Nuno Moita, Oporto (PT); Jorge Teixeira Da Silva, Oporto (PT)

(73) Assignee: SOLARISFLOAT, LDA, Matosinhos (PT)

( * ) Notice: Subject to any disclaimer, the term of this patent is extended or adjusted under 35 U.S.C. 154(b) by 176 days.

(21) Appl. No.: 16/324,258

(22) PCT Filed: Sep. 1, 2017

(86) PCT No.: PCT/IB2017/055268
§ 371 (c)(1),
(2) Date: Feb. 8, 2019

(87) PCT Pub. No.: WO2018/055469
PCT Pub. Date: Mar. 29, 2018

(65) Prior Publication Data
US 2019/0170402 A1 Jun. 6, 2019

(30) Foreign Application Priority Data
Sep. 20, 2016 (PT) .......................................... 109620

(51) Int. Cl.
*F24S 20/70* (2018.01)
*H02S 20/32* (2014.01)
(Continued)

(52) U.S. Cl.
CPC ............. *F24S 20/70* (2018.05); *F24S 30/425* (2018.05); *H02S 20/32* (2014.12);
(Continued)

(58) Field of Classification Search
CPC ...... H02S 20/30; H02S 20/32; F24S 2030/11; F24S 2030/12; F24S 2030/15;
(Continued)

(56) References Cited

U.S. PATENT DOCUMENTS

| 5,228,924 A * | 7/1993 | Barker | F24S 30/425 |
| | | | 136/246 |
| 2009/0165841 A1* | 7/2009 | Gunn, Jr. | H02S 20/00 |
| | | | 136/245 |

(Continued)

FOREIGN PATENT DOCUMENTS

| CN | 2864493 Y | 1/2007 |
| CN | 101847665 A | 9/2010 |

(Continued)

OTHER PUBLICATIONS

CN-105790693-A English machine translation (Year: 2016).*

(Continued)

*Primary Examiner* — Andrew H Goden
(74) *Attorney, Agent, or Firm* — Lucas & Mercanti, LLP

(57) ABSTRACT

A tracking system for performing a movement control of a solar panel is provided, having a single axis solar tracking solution allowing an individual actuation of a solar panel and its respective rotation axis. The tracking system is applied in an individual solar panel, and has a local control unit, an electrical motor, a tracking actuator mechanism, a blockage unit and a tracking support mechanism, which is useful for solar power plant installations where individual panel tracking is an advantage due to site conditions such as irregular grounds or unstable locations as in aquatic sites or locations with variable slopes.

6 Claims, 4 Drawing Sheets

(51) Int. Cl.
*F24S 30/425* (2018.01)
*F24S 30/00* (2018.01)
*F24S 25/00* (2018.01)

(52) U.S. Cl.
CPC .... *F24S 2025/019* (2018.05); *F24S 2030/115* (2018.05); *F24S 2030/135* (2018.05); *F24S 2030/16* (2018.05); *Y02E 10/47* (2013.01)

(58) Field of Classification Search
CPC ............. F24S 2030/16; F24S 2030/115; F24S 2030/135; F24S 2025/019; F24S 20/70; F24S 30/425; F24S 30/452; G05D 3/105; F16H 25/20; F16H 2025/2031; F16H 2025/2037
USPC .................................................. 136/243–265
See application file for complete search history.

(56) References Cited

U.S. PATENT DOCUMENTS

| | | | |
|---|---|---|---|
| 2010/0180883 A1 | 7/2010 | Oosting | |
| 2011/0061481 A1* | 3/2011 | Zimmermann | F24S 30/452 74/89.23 |
| 2012/0125399 A1* | 5/2012 | Schatz | H02S 20/32 136/246 |
| 2013/0019921 A1 | 1/2013 | Au | |
| 2015/0188484 A1* | 7/2015 | Huang | H02S 20/32 74/89.36 |
| 2018/0031092 A1* | 2/2018 | Daniel | F16H 25/20 |

FOREIGN PATENT DOCUMENTS

| | | | |
|---|---|---|---|
| CN | 105790693 A * | 7/2016 | |
| DE | 202008005020 U1 | 9/2008 | |
| EP | 2275754 A2 | 1/2011 | |
| EP | 2708831 A2 | 3/2014 | |
| FR | 2995071 A1 | 3/2014 | |
| JP | 11273424 A * | 10/1999 | F24S 23/70 |
| JP | 2005290755 A | 10/2005 | |
| JP | 2008258500 A | 10/2008 | |
| KR | 100819861 B1 | 4/2008 | |
| WO | 2009121977 A1 | 10/2009 | |
| WO | 2010008584 A2 | 1/2010 | |
| WO | WO-2016141937 A1 * | 9/2016 | F16H 25/20 |

OTHER PUBLICATIONS

JP-11273424-A English machine translation (Year: 1999).*
EP 2275754 A2 English machine translation (Year: 2011).*
JP 2008-258500A English machine translation (Year: 2008).*
International Search Report for Corresponding International Application No. PCT/IB2017/055268 (15 Pages) (dated Dec. 7, 2017).

* cited by examiner

SOLAR PANEL TRACKING SYSTEM

CROSS-REFERENCE TO RELATED APPLICATIONS

This application is a 371 of PCT/IB2017/055268, filed Sep. 1, 2017, which claims the benefit of Portuguese Patent Application No. 109620, filed Sep. 20, 2016.

TECHNICAL FIELD

The present application discloses a solar panel tracking system.

BACKGROUND ART

The document US2010/0180883(A1) describes a double tracking system installed on a support structure (sub-frame supporting). The system has the capacity to actuate the movement of at least one solar panel by means of at least two linear actuators.

The document EP2708831(A1) describes a two axis tracking system with the ability to adjust the azimuth angle over time simulating the sun movement throughout the 24 hours of the day. It also adjusts the vertical angle depending on the season of the year. The tracking system therein presented is composed by three separate stems. One stem is fixed providing support for the panels' whilst the other two are movable cylinders used to adjust the panels' position.

Utility model CN2048886824(U) presents, as a tracking solution system, a rotational platform with solar panels where rotation is achieved by the use of two separate engines, a gear group, a support pivot and a blocking pin. The first engine adjusts the panel position according to the sun position and the second engine stops the movement of the system.

SUMMARY

The present application describes a solar panel tracking system comprising:
- A local control unit, configured to establish a communication network with a remote central control unit;
- A tracking actuator mechanism;
- A blockage unit;
- A tracking support mechanism comprising a support structure, a panel structure and two hinge assemblies, wherein,
- the panel structure comprises two horizontal beams for fixing the tracking mechanism by means of two lower half clamps and two top half clamps;
- the support structure comprises two vertical beams for fixing the panel structure, said vertical beams connecting to the two hinge assemblies;
- each hinge assembly comprises a hinge support with a round hole or with a slotted hole.

In one embodiment of the system, the local control unit comprises:
- A communication module;
- A processor unit, configured to actuate the tracking actuator mechanism upon receiving and processing an activation message sent by the remote central control unit.

In another embodiment of the system, the tracking actuator mechanism comprises:
- an electrical motor;
- a threaded shaft which is assembled to the blockage unit;
- a lock pin;
- a flange bearing,
wherein, the electrical motor promotes the rotation of the threaded shaft by means of the lock pin and the flange bearing.

Yet in another embodiment of the system, the electrical motor is connected to the threaded shaft by means of a bearing joint.

Yet in another embodiment of the system, the blockage unit comprises a nut mechanism which blocks the movement of the threaded shaft, said nut mechanism comprising two half nut supports attached to a nut-locking cap for fixing the unit to a base platform.

Yet in another embodiment of the system, each hinge assembly comprises additionally:
- A hinge part with two half clamps, adapted to fix one vertical beam of the support structure;
- At least two switches installed on each half clamp for defining movement limits of the tracking actuator mechanism;
- Two half hinge connectors for fixing the hinge assembly to a base platform.

General Description

The present application describes a tracking system for performing a movement control of a solar panel.

The approach now described is useful for solar power plant installations where individual panel tracking is an advantage due to site conditions such as irregular grounds or unstable locations as in aquatic sites or locations with variable slopes. In fact, it is possible to track the solar elevation with a single solar panel, which is of a particular interest when the solar power plant location does not allow the installation of conventional tracking solutions, where a perfect alignment position between adjacent panels must be respected.

With this solution, and considering the solar plant installation scenario mentioned above, each solar panel moves independently from the next, allowing the implementation of a solar power plant installation in remote areas with significant terrain slopes or in aquatic locations where there is constant relative movement between panels due to undulation. For the purpose of this application, a single axis solar tracking solution is described, allowing an individual actuation of a solar panel and its respective rotation axis.

The tracking system now developed is to be applied in an individual solar panel, and comprises a local control unit, a tracking actuator mechanism, a blockage unit, a tracking support mechanism.

The movement of a solar panel structure is controlled by a central control unit, which is external to the solar panel tracking system. Said central control unit, according to the radiation direction registered in a certain area, instructs the tracking system of the respective solar panel to adjust its position. Specifically, the activation message emitted by the central control unit is received by the local control unit of the tracking system, which will actuate the tracking actuator mechanism in order to move the solar panel structure accordingly.

The local control unit of the tracking system is comprised by a communication module, adapted to establish wired/wireless link communications with the central control unit. It also comprises a processor unit, configured to convert the activation message received by the central control unit in an actuation procedure for the tracking actuator mechanism.

The tracking actuator mechanism is composed by an electrical motor, for example a two way motor, which is connected to a threaded shaft by means of a half bearing joint, promoting the positioning of the solar panel in an infinite range of degrees between 0 and 60°. The two way motor allows the activation of the solar panel movement up and down between 0 and 60°.

The blockage unit guarantees the correct positioning of the solar panel. Said unit comprises a nut mechanism that stops the threaded shaft movement. The nut joins the two half nut supports that are attached to the nut-locking cap fixing this sub-assembly to the platform.

The tracking support mechanism comprises a support structure, a panel structure and two hinge assemblies. The support structure and the panel structure are composed by a set of rigidly connected beams, which are responsible for the solar panel fixation and structural stability of the solution. Therefore, the panel integrity is unaffected by any movements sustained by the panel support and/or support and structure resulting from, but not exclusively, the movement due to the tracking mechanism or any external event to the solution such as wind or undulation.

The panel structure is composed by two structural horizontal beams, which connect to the tracking mechanism by means of a set of two lower half clamps and two top half clamps. These are responsible for promoting the tracking actuator mechanism rotation axis where the half bearing joint connects to the panel structure. The panel structure is also rigidly fixed to two structural vertical beams of the support structure, which then connect to two hinge parts that are part of two hinge assemblies, one on each end.

Each hinge assembly is composed of a hinge part and two half clamps, for fixation of the vertical beam of the support structure, two half hinge connectors for connection to a base platform through an hinge support. the hinge support could be formed by a round hole or a slotted hole. In a preferred embodiment, one hinge support has a hole (hinge support with the round hole), and the other one has a slotted hole (hinge support with slotted hole). Both hinges are responsible for connecting the components on each side, however, the hinge with the slotted hole allows the system to have a gap. This will compensate any misalignment during installation and allow the entire system to have a finite range of motion when in service. This will allow the system to adjust for any internal structural solicitation resulting, for example, from the movement of the system or any external solicitation such as strong winds.

A number of at least two switches are installed on each half clamp, acting as end-of-course switches for the panel movement limits (0° and 60°). When the system is in movement and reaches one of the two extreme positions, 0° or 60°, these switches are pressed and the system stops.

In solar power plants this system is replicated to every individual solar panel. The panels can be installed in a non-uniform configuration that optimizes the available installation area.

BRIEF DESCRIPTION OF DRAWINGS

For easier understanding of this application, figures are attached in the annex that represent the preferred forms of implementation which nevertheless are not intended to limit the technique disclosed herein.

DESCRIPTION OF EMBODIMENTS

Figure 1:
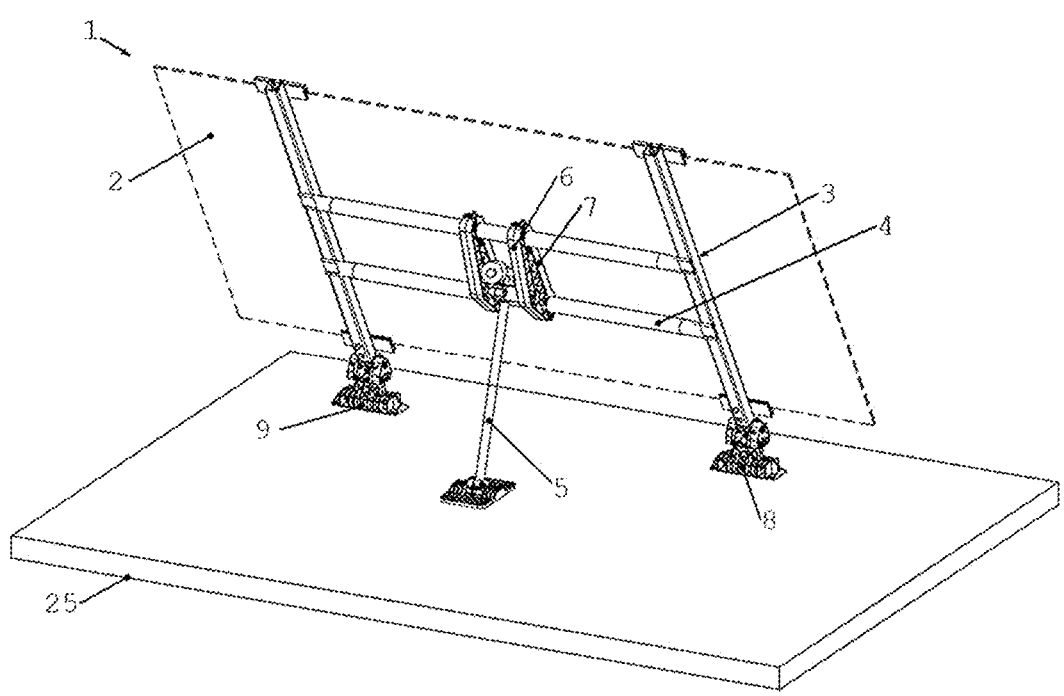
FIG. 1: Schematic representation of the single axis tracking system applied to a solar panel supported on a structure/platform, where the reference numbers represents:
1—Solar panel tracking system;
2—Solar panel;
3—Support structure;
4—Panel structure;
5—Tracking actuator mechanism;
6—Lower half clamp;
7—Top half clamp;
8—Hinge assembly with a hinge support with round hole;
9—Hinge assembly with a hinge support with slotted hole;
25—platform.
Figure 2:
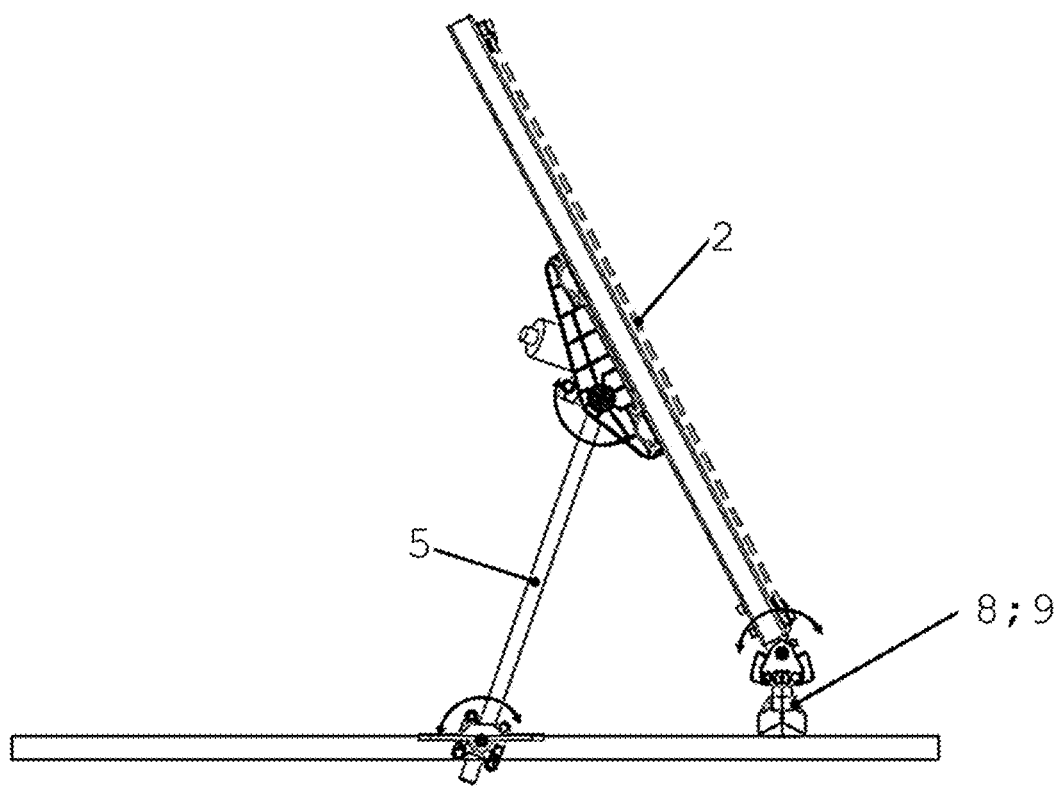
FIG. 2: Schematic representation of the operation of the tracking system, where the reference numbers represents:
2—Solar panel;
5—Tracking actuator mechanism;
8—Hinge assembly with a hinge support with round hole;
9—Hinge assembly with a hinge support with slotted hole.
Figure 3:
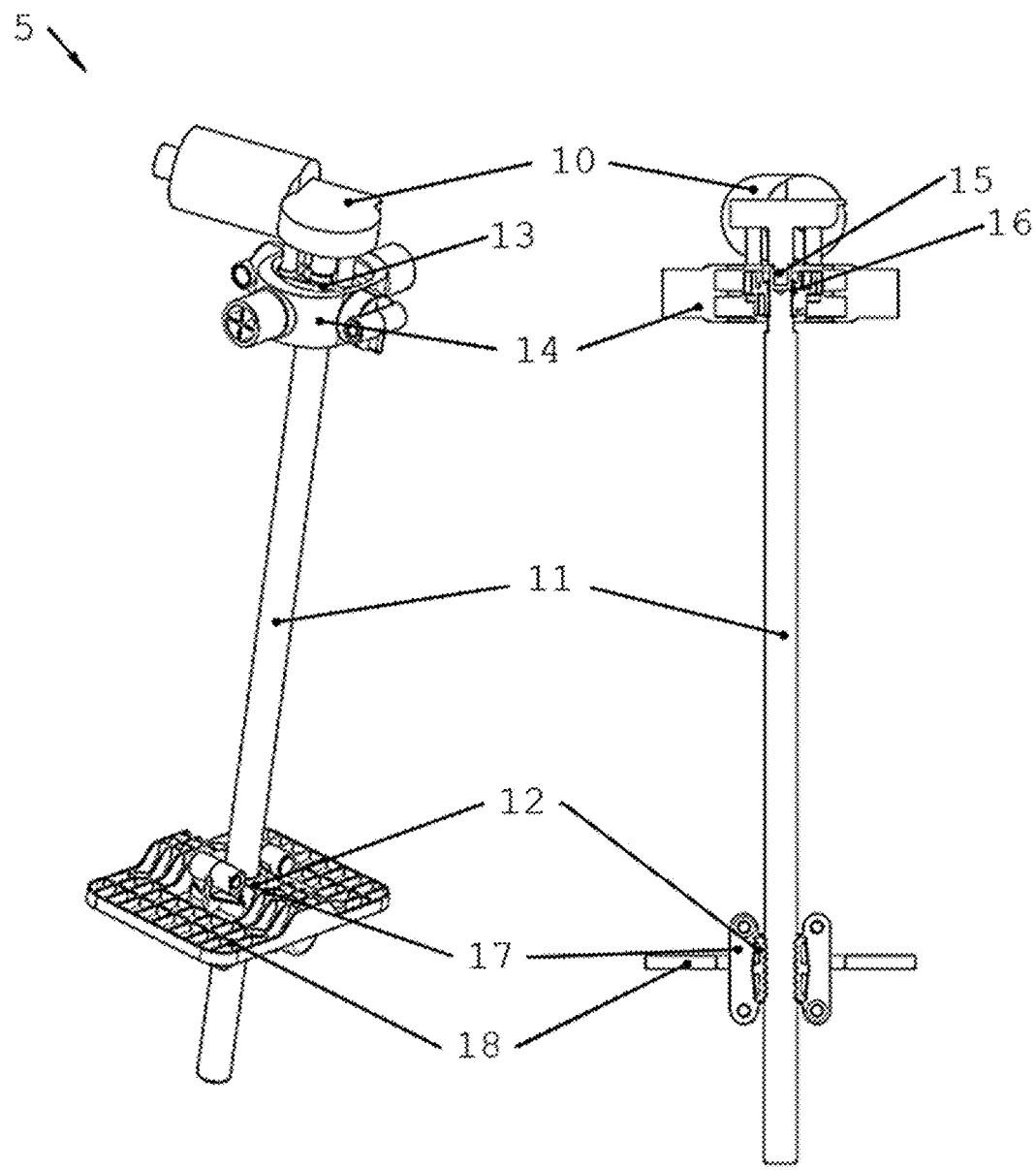
FIG. 3: Schematic representation of the tracking actuator mechanism, in a sectional cut showing the individual components, where the reference numbers represents:
5—Tracking actuator mechanism;
10—Electrical motor;
11—Threaded shaft;
12—Nut;
13—Motor support bearing;
14—Half bearing joint;
15—Lock pin;
16—Flange bearing;
17—Half nut support;
18—Nut locking cap.
Figure 4:
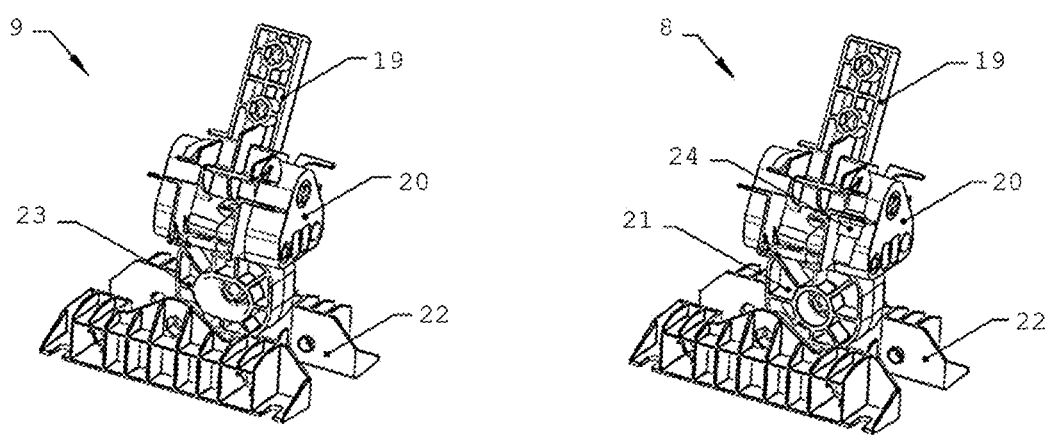
FIG. 4: Schematic representation of the hinge with round hole and of the hinge with slotted hole, where the reference numbers represents:
8—Hinge assembly with a hinge support with a round hole;
9—Hinge assembly with a hinge support with a slotted hole;
19—Hinge part;
20—Half clamp;
21—Hinge support with round hole;
22—Half hinge connector;
23—Hinge support with slotted hole;
24—Switch.

For easier understanding of this application, figures are attached in the annex that represent the preferred forms of implementation which nevertheless are not intended to limit the technique disclosed herein.

The present application discloses a single axis tracking system (1) applied to a solar panel (2) supported on a structure/platform. This tracking system includes:

A support structure (3) where the solar panel (2) is fixed by means of the panel structure (4). The panel structure (4) is connected to the tracking actuator mechanism (5) by four half clamps: two lower half clamps (6) and two top half clamps (7). The support structure (3) is connected to the platform (25) by means of two hinges assemblies, wherein each assembly has a different hinge support: one having a round hole (8) and another one with a slotted hole (9).

The tracking actuator mechanism (5) is responsible for the solar panel (2) upwards and downwards movement when there is an action order to the motor (10) emitted by the central control unit. The electrical motor (10) is connected to a threaded shaft (11) which in turn is assembled to a nut (12) that guarantees the position and fixation of the system when there is no actuation order.

For this mechanism, the electrical motor (10) is connected to a motor support bearing (13), that when assembled with the half bearing joint (14) results in a rotation axis. The rotation of the threaded shaft (11) is promoted by the lock pin (15) and flange bearing (16) which are responsible for the friction reduction between these elements.

The nut (12) joins to the two half nuts support (17) and nut locking cap (18) allowing this mechanism to attach itself to any platform.

The hinge with the round hole (8) is constituted by the hinge part (19), the two half clamps (20), the hinge support with the round hole (21) and the two half hinges connectors (22).

The hinge with the slotted hole (9) is constituted by the hinge part (19), the two half clamp (20), the hinge support with slotted hole (23) and two the half hinge connector (22).

Both hinges are attached to the support structure (3) by the hinge part (19) and the hinge support with the slotted hole (23) that is responsible for compensating the structure movements without compromising the panel (2) structural integrity.

At least two switches (24) are attached to the half clamps (20), these act as end-of-course limits when the system is in service. The rotation of the hinge part (19) will push the switch if it reaches the maximum lower position (0°) or the maximum top position (60°) triggering the motor (10) to stop.

The present invention is applied to solar power plant, preferably in aquatic settings where water movement and wind cause loads on the structure. The application of this individual tracking system on each solar panel allows for the solar panel independent movement of the platform and adjacent solar panels.

The present embodiment is of course in no way restricted to the embodiments herein described and a person of ordinary skill in the art will be capable of providing many modification possibilities thereto without departing from the general idea of the invention as defined in the claims.

The embodiments described above are obviously combinable with each other. The following claims define further preferred embodiments.

The invention claimed is:

1. A solar panel tracking system comprising:
   a local control unit, configured to establish a communication network with a remote central control unit;
   a blockage unit comprising a nut mechanism comprised by two half nut supports attached to a nut-locking cap;
   a tracking actuator mechanism comprising an electrical motor and a threaded shaft, the electrical motor connected to the threaded shaft which in turn is connected to the nut mechanism of the blockage unit;
   a tracking support mechanism comprising a support structure where a solar panel is fixed by means of a panel structure which is connected to the tracking actuator mechanism, and two hinge assemblies for providing the connection of the support structure to a base platform; wherein,
   the tracking actuator mechanism comprises:
      a motor support bearing and a half bearing joint;
      a lock pin and a flange bearing;
      the electrical motor connected to the motor support bearing and assembled with the half bearing joint;
      and further connected to the threaded shaft by means of the half bearing joint, promoting rotation of the threaded shaft by means of the lock pin and the flange bearing which are responsible for friction reduction between the lock pin and flange bearing, positioning the panel structure according to an activation message sent by the remote central control unit to the local control unit; and
   the nut-locking cap securing the threaded shaft to the base platform; and
   each of the two hinge assemblies have a different hinge support, one hinge assembly comprising a hinge with round hole and another hinge assembly comprising a hinge with slotted hole,
      the hinge with round hole comprising a hinge part, two half clamp, a hinge support with round hole and two half hinges connectors,
      the hinge with the slotted hole comprising a hinge part, two half clamp, a hinge support with slotted hole and two half hinge connectors, wherein the hinge support with the slotted hole compensates the panel structure movements without compromising the solar panel structural integrity.

2. The solar panel tracking system according to claim 1, wherein the panel structure comprises two horizontal beams for fixing the tracking actuator mechanism by means of two lower half clamps and two top half clamps.

3. The solar panel tracking system according to claim 1, wherein the support structure comprises two vertical beams for fixing the panel structure, said vertical beams connecting to the two hinge assemblies.

4. The solar panel tracking system according to claim 1, wherein the local control unit comprises:
   a communication module; and
   a processor unit, configured to actuate the tracking actuator mechanism upon receiving and processing the activation message sent by the remote central control unit.

5. The solar panel tracking system according to claim 1, wherein each hinge assembly comprises additionally:
   at least two switches installed on each half clamp for defining movement limits of the tracking actuator mechanism.

6. The solar panel tracking system according to claim 1, wherein the two half hinge connectors of each of the hinge assemblies are fixed to the base platform.

* * * * *